United States Patent [19]

Marcell

[11] 4,388,842
[45] Jun. 21, 1983

[54] LOCKING DEVICE FOR A DIFFERENTIAL MECHANISM

[75] Inventor: Gerald V. Marcell, Costa Mesa, Calif.

[73] Assignee: Kawasaki Motors Corp., Santa Ana, Calif.

[21] Appl. No.: 165,223

[22] Filed: Jul. 1, 1980

[51] Int. Cl.³ .............................................. F16H 1/44
[52] U.S. Cl. ...................................... 74/710.5; 74/713
[58] Field of Search ....................... 74/711, 713, 710.5

[56] References Cited

U.S. PATENT DOCUMENTS

| | | | |
|---|---|---|---|
| 964,387 | 7/1910 | Burnam | 74/710.5 |
| 1,017,407 | 2/1912 | Grabowsky | 74/710.5 |
| 1,437,692 | 12/1922 | Tolson | 74/710.5 |
| 1,466,778 | 9/1923 | Woods | 74/710.5 |
| 1,719,095 | 7/1929 | West | 74/710.5 |
| 2,132,692 | 10/1938 | Lawrence | 74/710.5 |
| 2,836,084 | 5/1958 | Lance | 74/710.5 |
| 2,947,200 | 8/1960 | Stump | 74/710.5 X |
| 3,215,000 | 11/1965 | Senkowski et al. | 74/710.5 |
| 3,406,592 | 10/1968 | Von Kaler | 74/710 |
| 3,908,775 | 9/1975 | Van Fossen | 74/710.5 |
| 4,248,105 | 2/1981 | Downing et al. | 74/710.5 |
| 4,271,722 | 6/1981 | Campbell | 74/710.5 |
| 4,273,006 | 6/1981 | Woodbury | 74/710.5 |

FOREIGN PATENT DOCUMENTS

| | | | |
|---|---|---|---|
| 2343401 | 9/1977 | France | 74/710.5 |
| 1017911 | 1/1966 | United Kingdom | 74/710.5 |

Primary Examiner—Lawrence J. Staab
Assistant Examiner—Lawrence J. Gotts
Attorney, Agent, or Firm—Poms, Smith, Lande & Rose

[57] ABSTRACT

A locking device for a differential mechanism wherein the locking device comprises a locking gear movable along an axis normal to the axes of rotation of a pair of side planetary gears and a pair of pinion sun gears, the locking gear being engageable with both pairs of planetary and sun gears to minimize and reduce radial stressing of said pairs of gears in locked condition, the locking device being readily manually actuated and retained in locked or unlocked condition.

5 Claims, 6 Drawing Figures

LOCKING DEVICE FOR A DIFFERENTIAL MECHANISM

BACKGROUND OF INVENTION

Differential mechanisms are conventionally used to transmit driving forces to a pair of drive wheels of a vehicle and to permit said wheels to change their speed of rotation and travel when the vehicle is turning. Under certain road conditions such as mud, ice, snow, or rough irregular terrain, the traction of one drive wheel with the ground surface may differ from the traction of the other drive wheel. Such difference in traction with the differential mechanism in operation may result in a loss of driving force imparted to one of the drive wheels. In some instances, one drive wheel may slip to such an extent that it may spin freely with a complete loss of driving force at that wheel. Substantial driving power is thereby lost. Under such conditions, locking of the differential to prevent differential operation permits transmission of driving forces through the locked differential mechanism directly and substantially equally to the wheels.

Locking devices for differential mechanisms have been employed heretofore to alleviate such conditions. A simple prior proposed locking device has included a lock pin moved into engagement with a hole in one of the parts of the differential mechanism. The shear stress imparted to such a pin was very great and undesirable because such stress often resulted in shearing of the lock pin and a resumption of differential operation.

Another type of prior proposed locking device for a differential mechanism included the movement of a locking collar splined to a half axle and movable axially to engage a toothed locking member fixed for rotation with a rotatable differential cage, U.S. Pat. No. 3,215,000. Another prior proposed locking device for a tractor transmission included the axial movement of a sliding second pinion gear along a drive shaft having a fixed pinion gear for engagement with juxtaposed bevel gears on spaced brake drums, U.S. Pat. No. 2,836,084.

SUMMARY OF INVENTION

The present invention relates to a locking device for a differential mechanism for a vehicle and more particularly relates to a locking gear movable into locking engagement with planetary and sun gears of the differential mechanism.

The invention contemplates a locking gear movable along an axis into locked and unlocked position, the axis being perpendicular or normal to the axes of the sun and planetary gears of a differential mechanism. The locking gear is adapted to lockingly engage each of the sun and planetary gears to thereby minimize and reduce stress, in locking position, imposed upon the locking gear and shaft carrying the locking gear. The invention contemplates such a locking device for a differential mechanism particularly adapted for lightweight vehicles such as a three wheel motorcycle, small garden tractors, riding lawn mowers, and the like.

The primary object of the present invention is to provide a novel locking means for a differential mechanism including a pair of sun gears enmeshed with a pair of planetary gears, such gears being mounted in a rotatable differential housing or cage.

An object of the invention is to provide a locking means for a differential mechanism in which radial stresses in locking position are substantially reduced.

Another object of the present invention is to provide a locking gear for a differential mechanism having sun and planetary gears in which the locking means is readily and conveniently actuated to locking and unlocked position.

A further object of the invention is to provide a differential mechanism having a differential housing with a chamber portion adapted to accommodate a locking gear.

Various other objects and advantages of the present invention will be readily apparent from the following description of the drawings in which an exemplary embodiment of the invention is shown.

Figure 1:
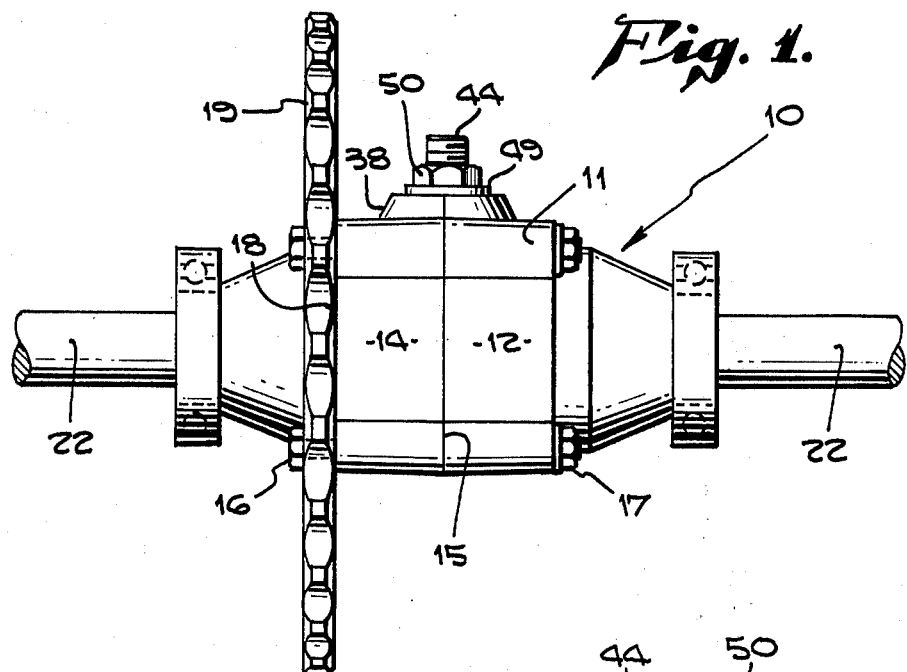
FIG. 1 is an elevational view of a differential mechanism embodying this invention.
Figure 6:
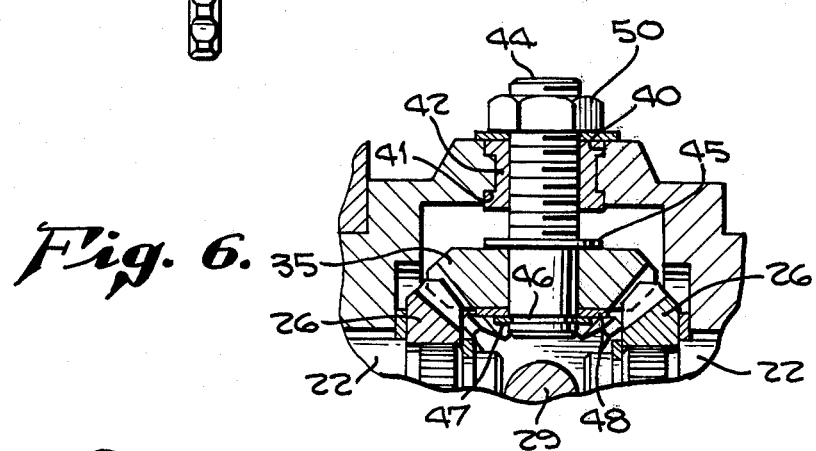
FIG. 6 is a fragmentary sectional view taken in the same plane as FIG. 3 and showing locked position of the locking gear.
Figure 2:
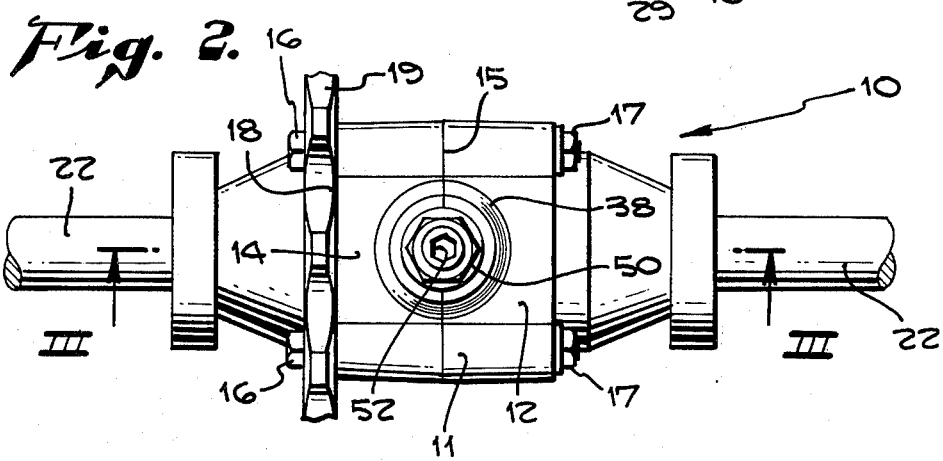
FIG. 2 is a top view thereof.

In the drawings a differential mechanism embodying the locking device of the present invention is generally indicated at 10. Differential mechanism 10 comprises a revolving gear housing 11 formed of substantially similar housing portions 12 and 14 joined at a housing joint or split line 15. Housing portions 12 and 14 are held in assembly by a plurality of spaced throughbolts 16 and associated nuts 17. Housing portion 14 is provided with an annular face 18 against which a drive member 19 may be firmly seated and secured by the bolt and nut assemblies 16, 17. Drive member 19 may be a sprocket having peripheral teeth engaged by a suitable drive chain in well-known manner or drive member 19 may be an annular ring gear engaged by a driving pinion, not shown. Drive member 19 rotates gear housing 11 about an axis 21 coaxial with the axes of stub shafts 22 extending from opposite sides of housing 11 and adapted to carry suitable ground engaging wheels.

Figure 3:
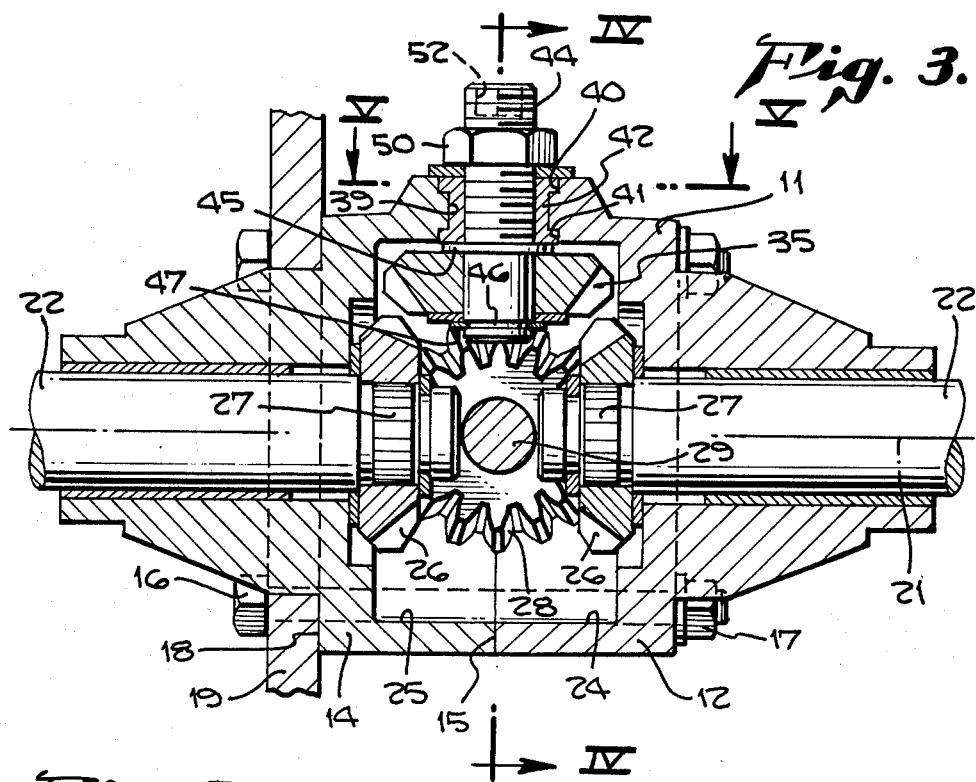
FIG. 3 is a sectional view taken in a plane longitudinally bisecting the differential mechanism, shown in unlocked position as indicated by line III—III of FIG. 2.
Figure 5:
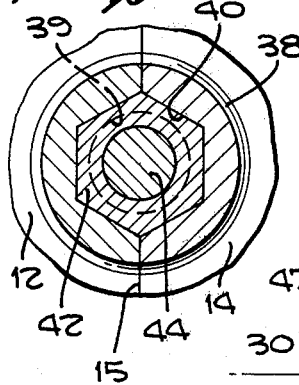
FIG. 5 is a sectional view taken in the plane indicated by line V—V of FIG. 3.
Figure 4:
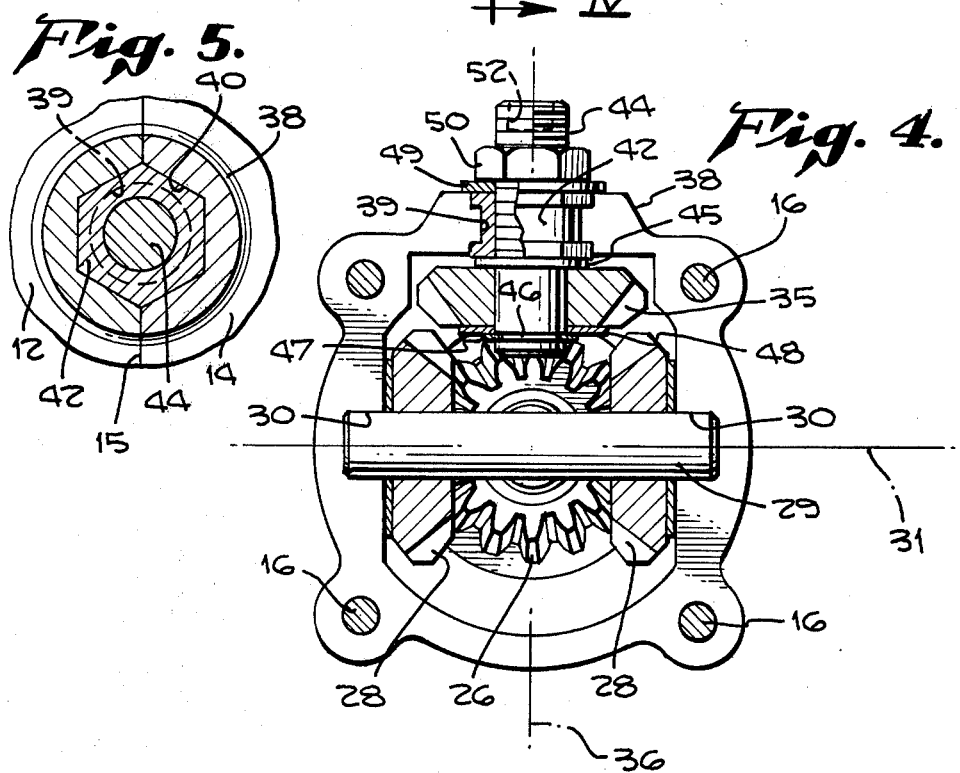
FIG. 4 is a transverse sectional view taken in the plane indicated by line IV—IV of FIG. 3.

Referring to FIG. 3, each housing portion 12 and 14 includes similarly shaped internal gear chambers 24, 25 into which inboard ends of axles 22 project and are fitted with side or planetary bevel gears 26. Gears 26 are carried on such inboard ends in a well-known manner as by interengaging splines as at 27 and secured thereon in a well-known manner. Side planetary gears 26 are engaged by sun pinion gears 28 carried on a transversely extending drive pin 29 which passes between inboard ends of axles 22 and which has drive pin ends supported in matching recesses 30 provided in opposed joint faces of housing portions 12, 14. Drive pin 29 serves to transmit driving forces from drive member 19 through gear housing 11 to the sun pinion gears and then to the side planetary gears for rotation of axles 22.

The above described gear housing and arrangement of sun pinion gears and side planetary gears generally follows the arrangement shown in U.S. Pat. No. 3,406,592 and does not form a part of this invention.

The present invention provides an arrangement of a locking gear 35 mounted for reciprocal movement along an axis 36 which is perpendicular to or normal to the transverse axis 31 of the drive pin 29 and sun pinion gears 28 and the axis 21 about which the side planetary gears 26 rotate. Each housing portion 12 and 14 is provided with a semi-dome like section 38 defining an opening 39 along axis 36 having outer and inner hexagonal in plan rabbeted edges 40 and 41 adapted to receive, seat and nonrotatably position threaded fitting or nut 42 having a cylindrical center portion and hexagonal outer and inner flange portions which mate with the hexagonal configuration of recesses 40 and 41.

Nut 42 is provided with internal threads adapted to engage threads on a shaft 44 coaxial with axis 36. Shaft 44 provides mounting for the lock gear 35 and includes an intermediate annular flange 45 serving to position shaft 44 against nut 42 and also serving to position the upper face of lock gear 35. Shaft 44 is provided with an inner end having an annular groove 46 which may receive a suitable lock ring 47 which positions the opposite lower face of lock gear 35 and bears against a suitable washer 48. The upper end of shaft 44 may carry a spring washer 49 and a lock nut 50 for securely positioning the shaft 44 in selected axial displacement along axis 36. The upper end of shaft 44 contains an internal axial socket 52 which may receive an allen wrench (not shown) for turning and threading shaft 44 in nut 42.

In the position shown in FIG. 3, lock gear 35 is located above and out of contact with sun and planetary gears 28 and 26. Gear 35 is a bevel gear having the same tooth configuration a sun gears 28 and planetary gears 26 and is adapted to interengage and mesh with both sun gears and both planetary gears when the bevel gear 35 is lowered into locking position therewith. Movement of lock gear 35 into locking position is accomplished by loosening lock nut 50 and then turning shaft 44 with the allen wrench until the teeth of lock gear 35 enmesh with the teeth of gears 26 and 28. In gear locked position, lock nut 50 is then tightened and the lock gear 35 serves to lock the differential gears 26, 28 against differential operation.

It will be apparent that movement of shaft 44 and lock gear 35 into locked position in this example is accomplished manually while the vehicle is stopped. In locked position it will be apparent that one or more teeth of the lock gear 35 is in full or partial engagement with teeth on each of the sun and planetary gears 26 and 28. Since all four differential gears are locked against relative movement, it will be apparent that locking stresses are spread substantially equally over four gears and are reduced with respect to each of the differential sun and planetary gears. Further the axial force required to hold the locking gear in locked position is reduced and minimized.

In the present example of the invention, manual means are used to move the locking gear 35 into and between locked and unlocked position. It will be understood that other means may be used to cause the locking gear to be axially displaced into locked or unlocked position and that such displacement may be synchronized and may be controlled by external means other than a wrench.

Any modifications and changes in the example of the invention described above and coming within the scope of the appended claims are embraced thereby.

I claim:

1. A locking device for a differential mechanism including a pair of sun gears on a first axis and a pair of planetary gears on a second axis normal to the first axis for meshed interengagement comprising in combination:
   a bevel locking gear on a shaft supported independently of said pairs of sun and planetary gears and about a third axis perpendicular to the first and second axes;
   said shaft and bevel locking gear being reciprocally movable along said third axis from a first position of simultaneous engagement with said pairs of sun and planetary gears to a second position of disengagement from said pairs of sun and planetary gears.

2. Locking device for a differential mechanism having a coaxial pair of sun pinion gears on a first axis meshed with a pair of side planetary gears on a second axis normal to the first axis and a driving means including a revolving gear housing enclosing said pairs of sun pinion and planetary gears, comprising, in combination therewith:
   a locking gear mounted on said housing for reciprocal movement along a third axis perpendicular to the axes of said side and sun pinion gears;
   said locking gear lockingly engaging said pairs of side planetary and sun pinion gears in one position to prevent differential operation thereof;
   means for mounting said locking gear comprising a threaded fitting on said housing, a threaded shaft carrying said locking gear and engaged with said threaded fitting, and means for turning said shaft to engage and disengage the locking gear with said side planetary and sun pinion gears.

3. In a device as stated in claim 2 including
   lock means to selectively retain said locking gear in an engaged or disengaged position with said side planetary and sun pinion gears.

4. In a differential mechanism, the combination of:
   two side gears arranged on a first axis in spaced relation and connected to respective coaxial output shafts;
   two planetary gears arranged on a second axis perpendicular to the first axis and engaged with said side gears;
   a housing for said side and planetary gears and including a drive gear for rotating said housing; and a fifth gear comprising a bevel locking gear supported from said housing along a third axis perpendicular to said first and second axes and being selectively moveable along said third axis from a first position of simultaneous engagement with said side and planetary gears to a second position of disengagement from said side and planetary gears.

5. A locking device for a differential mechanism having a pair of sun gears on a first axis meshed with a pair of planetary gears on a second axis normal to the first axis and a driving means including a revolving gear housing enclosing said pairs of sun and planetary gears comprising in combination therewith:
   a bevel locking gear mounted on said housing for reciprocal movement along a third axis perpendicular to the first and second axes;
   said bevel locking gear lockingly engaging said pairs of planetary gears and sun gears in one position to prevent differential operation thereof; and means for mounting said bevel locking gear including a shaft carried by said housing along the axis of said bevel locking gear and supporting said bevel locking gear, said shaft being axially movable along said third perpendicular axis from a first position of simultaneous engagement with said pairs of sun and planetary gears to a second position of disengagement from said pairs of sun and planetary gears.

* * * * *